(12) United States Patent
Yoshida

(10) Patent No.: US 7,199,500 B2
(45) Date of Patent: Apr. 3, 2007

(54) CLAW-POLE ELECTRIC GENERATOR AND BICYCLE ELECTRIC GENERATOR HUB

(75) Inventor: Fuminori Yoshida, Costa Del Sol (SG)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/318,451

(22) Filed: Dec. 28, 2005

(65) Prior Publication Data

US 2006/0175927 A1    Aug. 10, 2006

(30) Foreign Application Priority Data

Feb. 4, 2005    (JP)    ............................. 2005-029540

(51) Int. Cl.
*H02K 1/12* (2006.01)

(52) U.S. Cl. ...................... 310/257; 310/45; 310/67 A

(58) Field of Classification Search ................ 310/216, 310/218, 254, 257, 43, 45, 263, 67 A
See application file for complete search history.

(56) References Cited

U.S. PATENT DOCUMENTS

| 2,243,318 | A | * | 5/1941 | Rawlings | ..................... 310/263 |
| 3,842,300 | A | * | 10/1974 | Daykin et al. | ............... 310/216 |
| 5,828,145 | A | * | 10/1998 | Nakamura | ................. 310/67 A |
| 5,903,083 | A | | 5/1999 | Mukai et al. | |
| 6,013,968 | A | | 1/2000 | Lechner et al. | |
| 6,060,810 | A | * | 5/2000 | Lee et al. | ..................... 310/254 |
| 6,133,669 | A | * | 10/2000 | Tupper | ........................ 310/263 |
| 6,239,532 | B1 | * | 5/2001 | Hollenbeck et al. | ........ 310/257 |
| 6,407,472 | B1 | * | 6/2002 | Takayanagi | ................... 310/45 |
| 6,517,328 | B2 | * | 2/2003 | Makino et al. | .......... 417/410.1 |
| 6,753,628 | B1 | * | 6/2004 | Neal | ............................ 310/43 |
| 6,892,439 | B1 | * | 5/2005 | Neal et al. | ..................... 29/596 |
| 7,002,280 | B2 | * | 2/2006 | Endo | .......................... 310/263 |
| 7,036,207 | B2 | * | 5/2006 | Neal | ............................ 29/597 |
| 2003/0001357 | A1 | | 1/2003 | Fujii et al. | |
| 2004/0092347 | A1 | | 5/2004 | Fukuda | |

FOREIGN PATENT DOCUMENTS

| DE | 196 32 391 | | 2/1998 |
| EP | 0982834 | | 3/2000 |
| EP | 1 216 916 | A2 | 6/2002 |
| EP | 1 361 146 | A1 | 11/2003 |
| EP | 1 381 021 | A2 | 1/2004 |

(Continued)

*Primary Examiner*—Tran Nguyen
(74) *Attorney, Agent, or Firm*—Global IP Counselors, LLP

(57) ABSTRACT

A claw-pole electric generator has a circumferentially arranged permanent magnet, a ring-shaped coil, a yoke and a cover member. The yoke surrounds an external periphery of the coil. The yoke has a stator yoke portion and a core yoke portion. The stator yoke portion is disposed between the coil and the permanent magnet. The core yoke portion is magnetically linked to the stator yoke portion. The core yoke is disposed on the external periphery of the coil. The coil and the yoke are rotatably disposed in relation to the permanent magnet. The stator yoke portion includes a plurality of first and second yoke sections having a plurality of plate-shaped pieces in a stacked arrangement on opposite sides of the coil in an axial direction. The cover member covers at least part of an external peripheral surface of the yoke section.

16 Claims, 13 Drawing Sheets

FOREIGN PATENT DOCUMENTS

| | | |
|---|---|---|
| EP | 1 391 375 A1 | 2/2004 |
| EP | 1 394 030 A1 | 3/2004 |
| EP | 1394030 | 3/2004 |
| GB | 2 314 213 A | 12/1997 |
| JP | 07-229909 A | 8/1995 |
| JP | 2000-062523 A | 2/2000 |
| JP | 2001-037108 A | 2/2001 |
| JP | 2001-088759 A | 4/2001 |
| JP | 2001-202017 A | 7/2001 |
| JP | 2003-011879 A | 1/2003 |
| JP | 2003-130886 A | 5/2003 |
| JP | 2004-229403 A | 8/2004 |

\* cited by examiner

CLAW-POLE ELECTRIC GENERATOR AND BICYCLE ELECTRIC GENERATOR HUB

CROSS-REFERENCE TO RELATED APPLICATIONS

This application claims priority under 35 U.S.C. § 119 to Japanese Patent Application No. 2005-029540. The entire disclosure of Japanese Patent Application No. 2005-029540 is hereby incorporated herein by reference.

BACKGROUND OF THE INVENTION

1. Field of the Invention

The present invention generally relates to a claw-pole electric generator and a bicycle electric generator hub that uses the same.

2. Background Information

Bicycle electric generator hubs that use claw-pole electric generators are known in the art. In some conventional claw-pole electric generators, a yoke is configured from a plurality of first and second stacked yokes obtained by stacking plate-shaped pieces. The conventional claw-pole electric generators configured from stacked yokes include those in which the plate-shaped pieces are formed into a C shape and have a yoke internal peripheral part, a yoke external peripheral part and a core part connecting the two. (See, for example, Japanese Patent Application Laid-Open No. 2001-202017.).

In this conventional electric generator, the first and second stacked yokes are mounted on a hub axle. The first and second stacked yokes are inserted in alignment with a circumferential direction into a plurality of yoke mounting grooves formed to the width of the first and second stacked yokes at either ends of a coil. The first and second stacked yokes are disposed alternately so that distal ends of the yoke external peripheral parts of the stacked plate-shaped pieces overlap and face opposite directions.

The conventional claw-pole electric generators configured from stacked yokes may also include plate-shaped pieces that have a disc part and a yoke external peripheral part that extends in a radial pattern from a peripheral edge of the disc part. The yoke external peripheral part bends toward a direction intersecting with the disc part. (See, for example, Japanese Patent Application Laid-Open No. 2004-229403.)

In this conventional electric generator, the first and second stacked yokes are mounted so that the disc parts of the stacked plate-shaped pieces are in alignment with an axial direction of the hub axle at both ends of the coil. The first and second stacked yokes are disposed alternately so that distal ends of the yoke external peripheral parts face opposite directions.

In either of the electric generators, the yoke external peripheral parts are disposed to allow a small gap to be formed in relation to a permanent magnet fixed in place on a hub shell in order to increase power generating efficiency. When the yoke is configured from these alternately disposed first and second stacked yokes, output loss due to eddy currents is reduced and the output characteristics are improved.

In the former conventional electric generator, the plate-shaped pieces of the stacked yoke may become misaligned from the radial direction of the hub axle. In the latter conventional electric generator, if the angles of curvature of the yoke external peripheral parts differ even slightly, the external peripheral surface of the yoke may be uneven as a result.

In either of these conventional electric generators, since the external peripheral parts of the stacked yokes are disposed to allow a small gap with the magnet, the external peripheral parts of the plate-shaped pieces may come into contact with the magnet if an external peripheral surface of the yoke becomes misaligned and uneven. Therefore, hardening a portion fixed to the hub axle that includes the yoke with a synthetic resin by insert molding or another such method has been considered as a solution to prevent these problems. However, if such a solution is employed, the weight of the fixed portion increases proportionate to the resin, causing a weight increase in the electric generator.

In view of the above, it will be apparent to those skilled in the art from this disclosure that there exists a need for an improved claw-pole electric generator that ensures the yoke does not contact the magnet. This invention addresses this need in the art as well as other needs, which will become apparent to those skilled in the art from this disclosure.

SUMMARY OF THE INVENTION

An object of the present invention is to suppress the weight increase and to ensure that the yoke external peripheral parts do not come into contact with the magnet in a claw-pole electric generator having a stacked yoke and an electric generator hub that uses the same.

The claw-pole electric generator relating to a first aspect of the present invention is an electric generator including a circumferentially arranged permanent magnet, a ring-shaped coil, a yoke and a cover member. The coil is configured and arranged on an internal peripheral side of the permanent magnet to rotate relative to the permanent magnet. The yoke has a stator yoke portion and a core yoke portion. The stator yoke portion is disposed between the coil and the permanent magnet. The core yoke portion is magnetically linked to the stator yoke portion. The core yoke portion is disposed on an external periphery of the coil such that the yoke is rotatable relative to the permanent magnet. The cover member covers at least part of an external peripheral surface of the yoke. The stator yoke portion includes a plurality of first and second yoke sections disposed on opposite sides of the coil in an axial direction, respectively, with each of the first and second yoke sections having a plurality of plate-shaped pieces in a stacked arrangement.

In this claw-pole electric generator, the permanent magnet and the stator yoke portion face each other, and an alternating magnetic flux is generated as a result of their relative rotation. An electric current flows into the coil and electricity is thereby generated. Specifically, an alternating magnetic flux is generated by alternately switching between a state in which the yoke external peripheral part of the first stacked yoke serves as the N pole and the yoke external peripheral part of the second stacked yoke serves as the S pole, and a state in which the yoke external peripheral part of the first stacked yoke serves as the S pole and the yoke external peripheral part of the second stacked yoke serves as the N pole. During this electricity generation, eddy currents are also created in addition to the alternating magnetic flux, but the creation of eddy currents can be reduced because the yoke is formed by stacking plate-shaped pieces. Since at least part of the external peripheral surface of the claw-pole yoke with few eddy currents is covered by a cover member, the plate-shaped pieces constituting the first and second yoke sections are not likely to be misaligned, and are also not likely to become uneven. Therefore, the yoke is not likely to come into contact with the permanent magnet even if narrower gaps are formed between the permanent magnet and the yoke external peripheral parts of the first and second yoke sections obtained by stacking a plurality of plate-shaped pieces. Moreover, since the entire yoke is not hardened by a synthetic resin and only at least part of the external peripheral surface of the yoke is covered, weight increase in the internal fixing unit is slight even with the cover member provided and the weight increase in the electricity-generating mechanism can be minimized.

The claw-pole electric generator relating to a second aspect of the present invention is the electric generator according to the first aspect of the present invention wherein the plate-shaped pieces are stacked in a circumferential direction between the coil and the permanent magnet with the first and second yoke sections alternately in the circumferential direction and the cover member covering at least part of external peripheral parts of the plate-shaped pieces. In this case, since the stacked yokes are formed by stacking the plate-shaped pieces in the circumferential direction, and have yoke external peripheral parts that function as a stator yoke portion, magnetic strain that normally occurs as a result of the plate-shaped pieces bending is not likely to occur. Also, since the cover member covers at least part of the yoke external peripheral parts, the plate-shaped pieces are not likely to be misaligned in the radial direction.

The electric generator relating to a third aspect of the present invention is the electric generator according to the first or second aspect of the present invention wherein the plate-shaped pieces of the first and second yoke sections are integral one-piece unitary members that form both the stator yoke portion and the core yoke portion. In this case, since the stator yoke portion and the core yoke portion are formed integrally, the electric generator is easily assembled, and the magnetic loss is low because the yoke is formed integrally by the external peripheral side and the internal peripheral side of the coil.

The claw-pole electric generator relating to a fourth aspect of the present invention is the electric generator according to the third aspect of the present invention, wherein each of the plate-shaped pieces has an external peripheral part that forms the stator yoke portion and an internal peripheral part that forms the core yoke portion with the internal peripheral parts extending in the axial direction. In this case, since the yoke internal peripheral parts are disposed facing in the axial direction, the core yoke portions of the first stacked yoke and the second stacked yoke are directly magnetically connected by the yoke internal peripheral parts, and there is no need for another magnetic member to be used for connecting the stacked yokes. Moreover, a sufficiently large magnetic path cross section for allowing a magnetic flux to pass between the stacked yokes can be ensured to avoid magnetic saturation.

The claw-pole electric generator relating to a fifth aspect of the present invention is the electric generator according to anyone of the first through fourth aspects of the present invention, further comprising a bobbin having first and second flanges and a cylindrical core extending in the axial direction between the first and second flanges, the coil being wound around an external periphery of the cylindrical core. In this case, since the coil is wound around a bobbin, the wound lines of the coil can easily be aligned. Also, the first and second yoke sections can easily be disposed at intervals in the circumferential direction using the bobbin.

The claw-pole electric generator relating to a sixth aspect of the present invention is the electric generator according to anyone of the first through fifth aspects of the present invention wherein the cover member has an external peripheral part covering the external peripheral surface of the yoke, and a pair of lateral parts covering side surfaces of the yoke. In this case, since the cover member covers not only the external peripheral surface of the yoke but also the side surfaces, the cover member is reliably fixed in place to the yoke, and the cover member is not likely to come off.

The claw-pole electric generator relating to a seventh aspect of the present invention is the electric generator according to anyone of the first through sixth aspects of the present invention wherein the cover member is formed by heat-shrinking a cylindrical member made of a heat-shrinkable synthetic resin. In this case, since the cover member is formed by compressing a cylindrical member made of a synthetic resin with heat, the cover member can be simply formed in accordance with the shape of the yoke.

The claw-pole electric generator relating to an eighth aspect of the present invention is the electric generator according to the seventh aspect of the present invention wherein the cover member is a heat-shrinkable synthetic resin selected from the group consisting of vinyl chloride resin, fluorine resin, silicone resin, ethylene-propylene resin, and polyethylene terephthalate (PET) resin.

The electric generator hub relating to a ninth aspect of the present invention is an electric generator hub provided to the middle of a front wheel mounted on the frame of a bicycle, comprising a hub axle, a hub shell, bearings, and a claw-pole electric generator. The hub axle is an axle mounted on the frame. The hub shell has a cylindrical shape and is disposed on the external peripheral side of the hub axle. The bearings are arranged to rotatably support the hub shell rotatably with respect to the hub axle. The claw-pole electric generator is the generator according to anyone of the first through eighth aspects, having the permanent magnet that is disposed between the bearings in a circumferential manner on the internal peripheral surface of the hub shell, and having the internal fixing unit that is disposed on the internal peripheral side of the permanent magnet and that is fixed in place to the hub axle.

With this electric generator hub, since the permanent magnet and the yoke external peripheral parts face each other when the front wheel rotates and the permanent magnet and the internal fixing unit rotate relative to each other, an alternating magnetic flux is generated in the core yoke portion. Specifically, an alternating magnetic flux is generated by alternately switching between a state in which the yoke external peripheral part of the first stacked yoke serves as the N pole and the yoke external peripheral part of the second stacked yoke serves as the S pole, and a state in which the yoke external peripheral part of the first stacked yoke serves as the S pole and the yoke external peripheral part of the second stacked yoke serves as the N pole. During this electricity generation, eddy currents are also created in addition to the alternating magnetic flux, but the creation of eddy currents can be reduced because a yoke is formed by stacking the plate-shaped pieces. Since at least part of the external peripheral surface of the claw-pole yoke with few eddy currents is covered by a cover member, the plate-shaped pieces constituting the first and second yoke sections are not likely to be misaligned. Therefore, the yoke is not likely to come into contact with the permanent magnet even if narrower gaps are formed between the permanent magnet and the yoke external peripheral parts of the first and second yoke sections obtained by stacking a plurality of plate-shaped pieces. Moreover, since the entire yoke is not hardened by a synthetic resin and only at least part of the external peripheral surface of the yoke is covered, weight increase in the internal fixing unit is slight even with the cover member provided and the weight increase in the electricity-generating mechanism can be minimized.

According to the present invention, since the cover member covers at least part of the external peripheral surface of the claw-pole yoke with few eddy currents, the plate-shaped pieces constituting the first and second yoke sections are not likely to be misaligned, and are also not likely to become uneven. Therefore, the yoke is not likely to come into contact with the permanent magnet even if narrower gaps are formed between the permanent magnet and the yoke external peripheral parts of the first and second yoke sections obtained by stacking a plurality of plate-shaped pieces. Moreover, since the entire yoke is not hardened by a synthetic resin and only at least part of the external peripheral surface of the yoke is covered, weight increase in the internal fixing unit is slight even with the cover member provided and the weight increase in the electricity-generating mechanism can be minimized.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
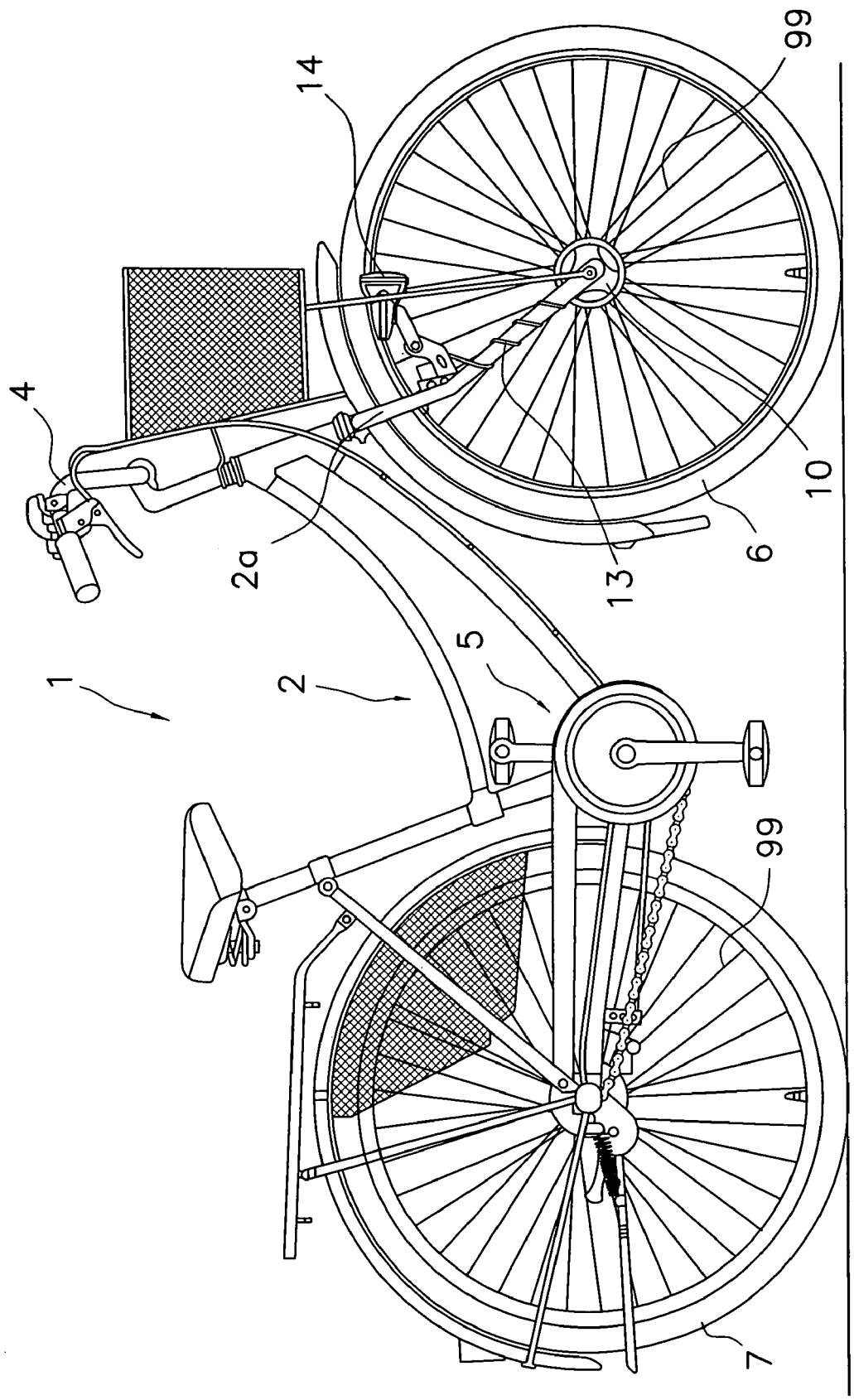
FIG. 1 is a side elevational view of a bicycle equipped with a claw-pole electric generator in accordance with a first embodiment of the present invention.

Referring initially to FIG. 1, a bicycle 1 is illustrated in accordance with a first embodiment of the present invention. The bicycle 1 includes a frame 2, a handlebar 4, a drive unit 5, a front wheel 6 and a rear wheel 7. The frame 2 includes a front fork 2a. The drive unit 5 includes a chain, pedals and the like. The front and rear wheels 6 and 7 are bicycle wheels having a plurality of spokes 99. The front wheel 6 has an electric generator hub 10 that is incorporated therein. Electricity generated by the electric generator hub 10 is supplied to a headlight 14 with an optical sensor via a power source line 13.

Figure 2:
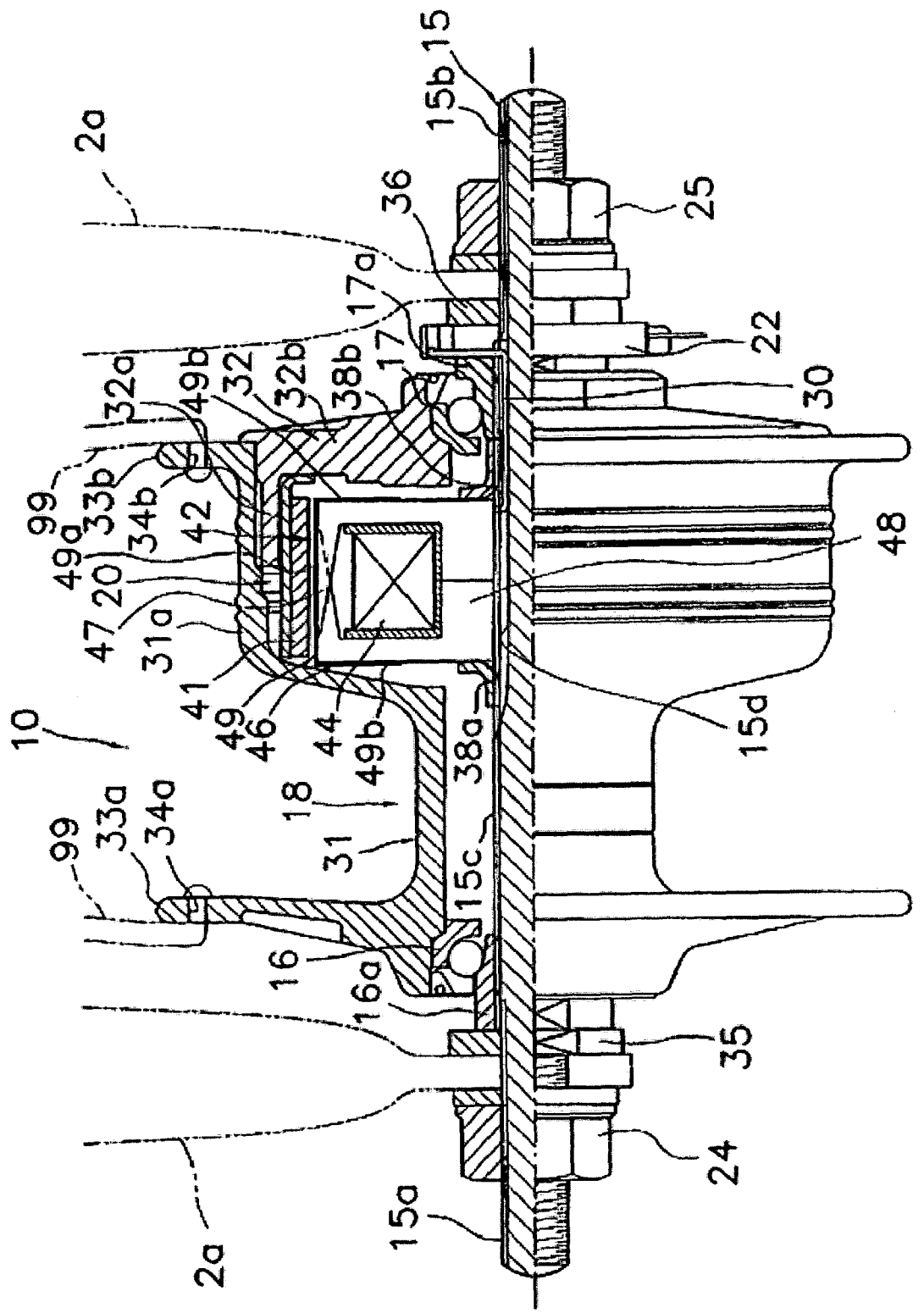
FIG. 2 is a partial cross-sectional view of the claw-pole electric generator of the bicycle illustrated in FIG. 1 in accordance with the first embodiment of the present invention.
Figure 3:
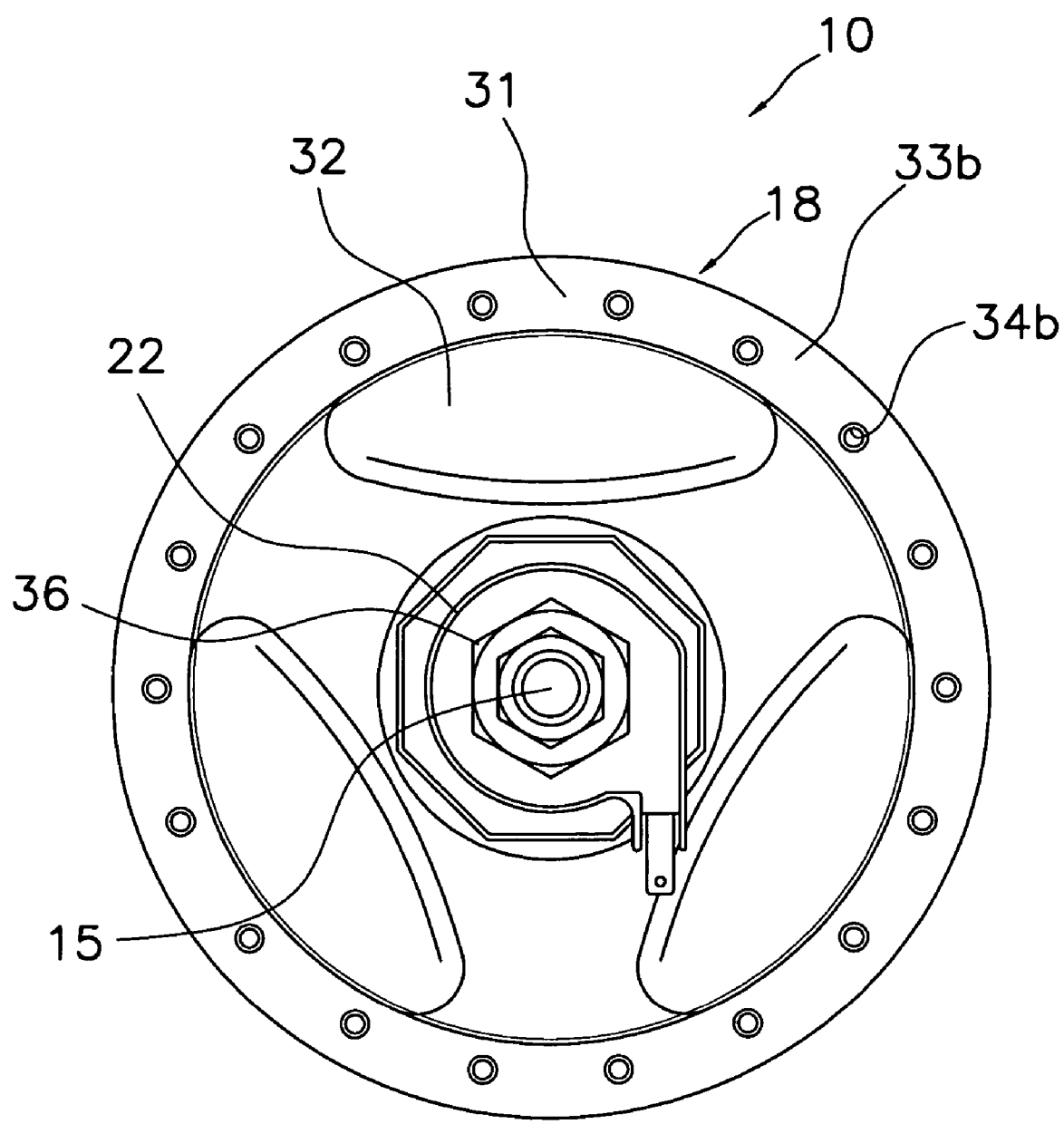
FIG. 3 is an axial end elevational view of the claw-pole electric generator of the bicycle illustrated in FIG. 1 in accordance with the first embodiment of the present invention.

Referring to FIGS. 2 and 3, the electric generator hub 10 is mounted on a distal end of the front fork 2a together with the front wheel 6 of the bicycle 1. The electric generator hub 10 includes a hub axle 15, a hub shell 18, an electricity-generating mechanism or a claw-pole electric generator 20 and a connector 22. The power source line 13 is connected to the connector 22. The hub axle 15 is fixed at both ends to the front fork 2a. The hub shell 18 is disposed on an external peripheral side of the hub axle 15. The hub shell 18 is rotatably supported on the hub axle 15 by first and second bearings 16 and 17. The electricity-generating mechanism 20 is disposed between the hub axle 15 and the hub shell 18. The connector 22 supplies electricity generated by the electricity-generating mechanism 20 to the headlight 14, for example, or another such external electrical device.

The hub axle 15 has first, second and third male threaded sections 15a, 15b and 15c and a wiring insertion groove 15d. The first and second male threaded sections 15a and 15b are formed at either end of the hub axle 15. The third male threaded section 15c is larger than the first and second male threaded sections 15a and 15b. The third male threaded section 15c is formed between the first and second male threaded sections 15a and 15b. The first, second and third male threaded sections 15a, 15b and 15c are formed on an external peripheral surface of the hub axle 15. The wiring insertion groove 15d is provided for passing an internal wire 30 through the external peripheral surface of the hub axle 15. The internal wire 30 connects the electricity-generating mechanism 20 with the connector 22. The wiring insertion groove 15d is formed from a portion of the hub axle 15 where the electricity-generating mechanism 20 is mounted to an end of the second male threaded section 15b. The hub axle 15 is non-rotatably fixed on the front fork 2a by first and second fixing nuts 24 and 25 that screw onto the first and second male threaded sections 15a and 15b, respectively.

The hub shell 18 has a case main body 31 and a lid member 32. The case main body 31 is a cylindrical member that extends in an axial direction of the hub axle 15. The case main body 31 has an expanding part 31a that extends farther out towards an external peripheral side of the case main body 31 at a second end (a right side in FIG. 2) in the axial direction than at a first end of the case main body 31. First and second hub flanges 33a and 33b are formed on the external peripheral side of the case main body 31 at the first and second ends of the case main body 31, respectively. The first flange 33a has a first mounting hole 34a and the second flange 33b has a second mounting hole 34b. The first and second mounting holes 34a and 34b are for mounting internal ends of the spokes 99. The first and second mounting holes 34a and 34b are formed at regular intervals in a circumferential direction with phases of the first and second mounting holes 34a and 34b half out of alignment.

The lid member 32 covers the second end (the right end in FIG. 2) of the case main body 31. The lid member 32 has a screw cylinder part 32a and a disc shaped rotating support unit 32b. The screw cylinder part 32a screws into an internal peripheral surface of the expanding part 31a. The disc shaped rotating support unit 32b is rotatably mounted on the hub axle 15. The lid member 32 is screwed and fixed in place on the case main body 31 by the screw cylinder part 32a.

The hub shell 18 is fixed in place on the hub axle 15 by first and second cones 16a and 17a. The first and second cones 16a and 17a are inner races of the first and second bearings 16 and 17 that screw onto the first and second male threaded sections 15a and 15b, respectively. The first and second cones 16a and 17a are positioned and locked into place by first and second locking nuts 35 and 36. The second locking nut 36 locks the second cone 17a in place. The second locking nut 36 fixes the connector 22 in place on the hub axle 15.

The electricity-generating mechanism 20 is a claw-pole type electrical generating mechanism that has a permanent magnet 41 and an internal fixing unit 42. The permanent magnet 41 is fixed on an internal peripheral surface of the screw cylinder part 32a. The internal fixing unit 42 is fixed on the hub axle 15. The internal fixing unit 42 is disposed facing an external periphery of the permanent magnet 41. The internal fixing unit 42 is rotatable in relation to the permanent magnet 41. The permanent magnet 41 is fixed on an internal side of the expanding part 31a of the case main body 31. The permanent magnet 41 is composed of a plurality (four, for example) of magnetic members separated by regular intervals in the circumferential direction. N poles and S poles of the magnetic members are alternately magnetized at regular intervals in the permanent magnet 41.

The internal fixing unit 42 has a ring-shaped coil 44, a yoke 46 and a cover member 49. The yoke 46 is provided so as to surround an outer periphery of the coil 44. The magnetic members of the permanent magnet 41 are disposed so as to face an external periphery of the yoke 46. The cover member 49 covers at least part of an external peripheral surface of the yoke 46. The coil 44 and the yoke 46 are non-rotatably fixed to the hub axle 15. The coil 44 and the yoke 46 are sandwiched by first and second mounting nuts 38a and 38b that screw onto the third male threaded section 15c. The first and second mounting nuts 38a and 38b are positioned in the axial direction in a positional relationship so that they are accommodated by the expanding part 31a.

Referring to FIGS. 5A, 5B, 6A and 6B, the coil 44 is wound around a bobbin 55. The bobbin 55 has a cylindrical core 56, a first flange 57 and a second flange 58. The first and second flanges 57 and 58 are formed at axial ends of the core 56. The coil 44 is wound around an external periphery of the cylindrical core 56. The first flange 57 has a plurality of first grooves 57a extending in a substantially radial pattern in an external axial side of the first flange 57. The second flange 58 has a plurality of second grooves 58a extending in a substantially radial pattern in an external side of the second flange 58. The first and second grooves 57a and 58a are alternately misaligned as viewed in the axial direction. That is, the second grooves 58a of the second flange 58 are positioned between two adjacent first grooves 57a of the first flange 57. The first and second grooves 57a and 58a partially overlap near a middle of the substantially radial pattern, as seen from the axial direction. Furthermore, the first and second grooves 57a and 58a almost entirely overlap in an internal peripheral side of the substantially radial pattern, as seen from the axial direction. A portion of the external peripheral sides of the first and second grooves 57a and 58a are cut out to form a plurality of first and second notches 57b and 58b. Also, referring to FIG. 7, a plurality of first and second concavities 57c and 58c with a specific length from the internal side to the external side in the axial direction are formed in the first and second flanges 57 and 58 where the first and second grooves 57a and 58a are not formed.

An end of the coil 44 (a right end in FIG. 2) is electrically connected to the connector 22 via the internal wire 30 and another end of the coil 44 (a left end in FIG. 2) is electrically connected to the hub axle 15 via the first mounting nut 38a or the like.

The yoke 46 has a stator yoke portion 47 and a core yoke portion 48. The stator yoke portion 47 is disposed between the permanent magnet 41 and the coil 44. The core yoke portion 48 is magnetically linked to the stator yoke portion 47. The core yoke portion 48 is disposed between an external periphery of the coil 44 and the hub axle 15, as shown in FIG. 2. In this embodiment, the stator yoke portion 47 and the core yoke portion 48 are formed integrally.

Figure 7:
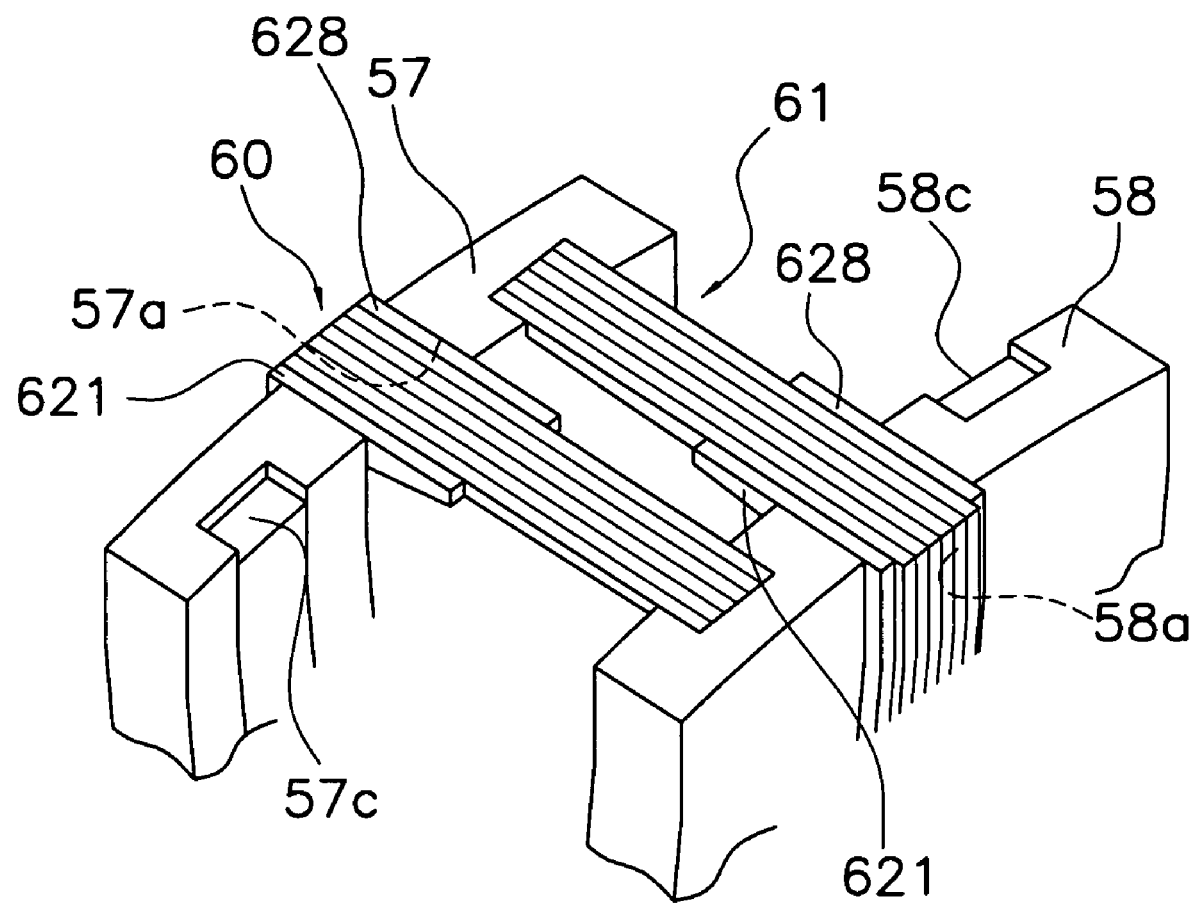
FIG. 7 is an enlarged, partial perspective view of the bobbin and a yoke of the claw-pole electric generator illustrated in FIGS. 2-4 in accordance with the first embodiment of the present invention.
Figure 8:
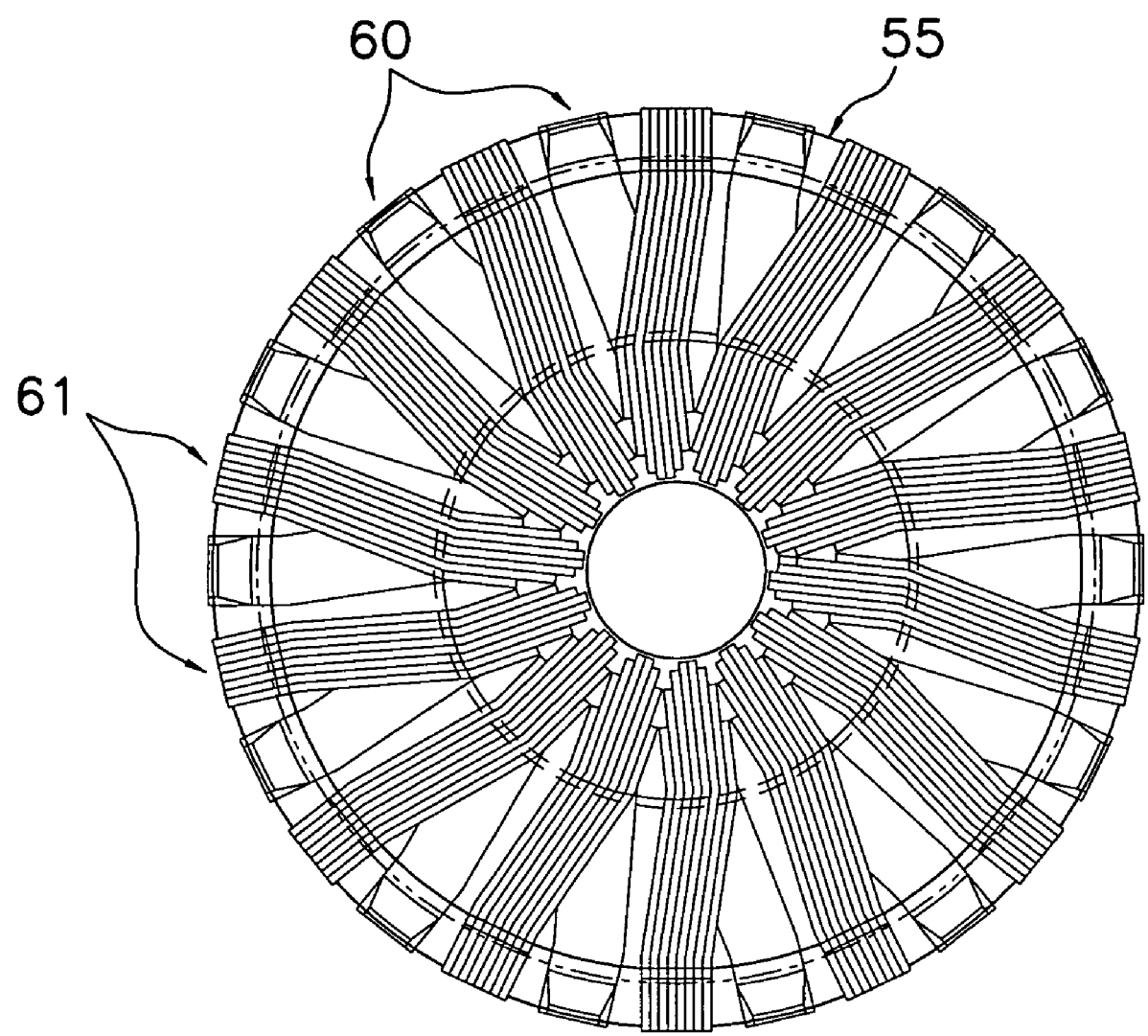
FIG. 8 is an axial end elevational view of the bobbin illustrated in FIG. 5A with the yoke illustrated in FIG. 7 in accordance with the first embodiment of the present invention.

FIGS. 7 and 8 show the yoke 46 mounted on the bobbin 55. The yoke 46 has a plurality of first yoke sections 60 and a plurality of second yoke sections 61. The first yoke sections 60 are mounted so as to interlock with the first grooves 57a of the first flange 57. The second yoke sections 61 are similarly mounted so as to interlock with the second grooves 58a of the second flange 58. The first and second yoke sections 60 and 61 are disposed on opposite sides in the axial direction in relation to the interposed coil 44. The coil 44 extends in the axial direction between the first and second flanges 57 and 58.

Figure 9:
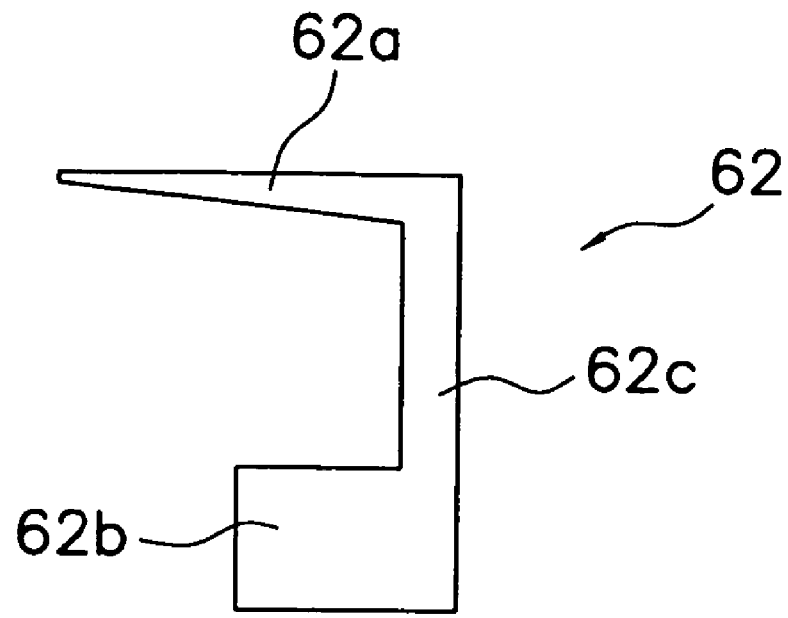
FIG. 9 is a side elevational view of a pair of plate-shaped pieces of the yoke illustrated in FIGS. 7 and 8 in accordance with the first embodiment of the present invention.
Figure 9:
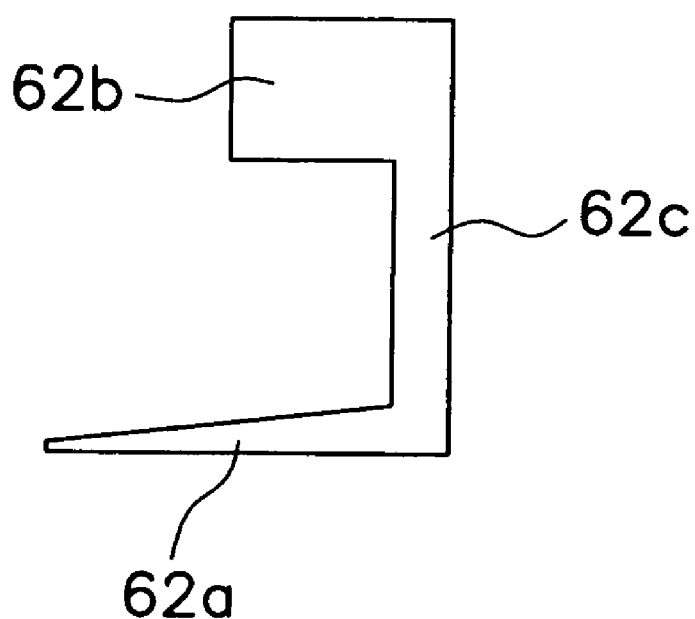
Figure 10:
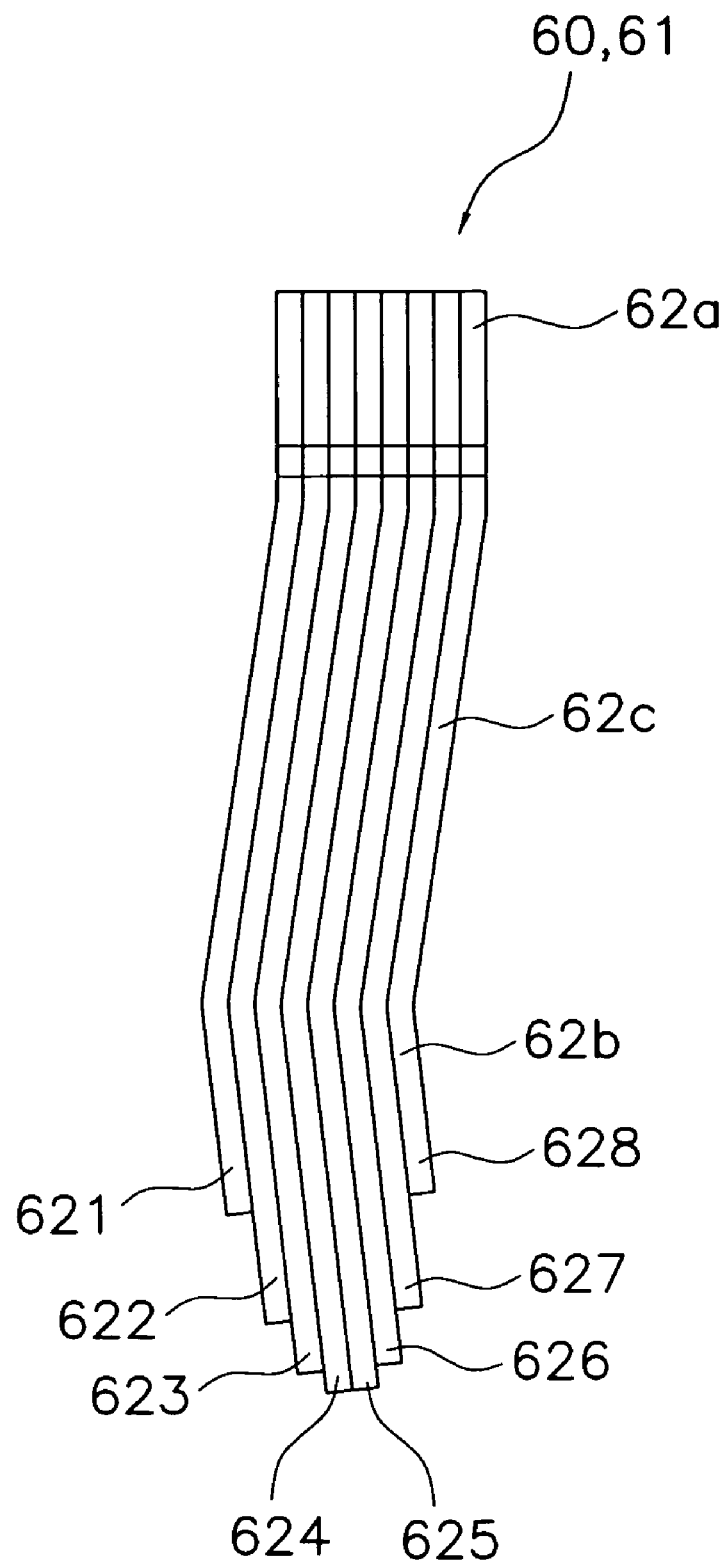
FIG. 10 is an elevational view of a plurality of the plate-shaped pieces illustrated in FIG. 9 in accordance with the first embodiment of the present invention.

The first and second yoke sections 60 and 61 are configured by stacking a plurality of plate-shaped pieces 62 in a stacked arrangement, as shown in FIGS. 9 and 10. The plate-shaped pieces 62 are formed from a silicon steel plate. More specifically, a flat silicon steel plate with an oxide film on a surface of the silicon steel plate is formed into the plate-shaped pieces 62. Each of the plate-shaped pieces 62 has the same basic shape. Each of the plate-shaped pieces 62 has a yoke external peripheral part 62a, a yoke internal peripheral part 62b and a connecting part 62c. The connecting part 62c connects the yoke external peripheral part 62a and the yoke internal peripheral part 62b together. It will be apparent to one of skill in the art from this disclosure that the core external peripheral parts 62a, the core internal peripheral parts 62b and the connecting parts 62c may be formed separately. As a result of using such separated plate-shaped pieces 62, it is possible to improve a yield when the plate-shaped pieces 62 are manufactured from a silicon steel plate.

The yoke external peripheral part 62a functions as the stator yoke portion 47. The yoke internal peripheral part 62b functions as the core yoke portion 48. The yoke external peripheral part 62a extends from an end of the connecting part 62c along the axial direction of the hub axle 5 (the direction O—O in FIG. 9). The yoke external peripheral part 62a tapers toward a distal end of the yoke external peripheral part 62a. Similarly, the yoke internal peripheral part 62b extends from another end of the connecting part 62c along the axial direction. As shown in FIG. 10, the plate-shaped pieces 62 are formed so that the yoke external peripheral parts 62a and the yoke internal peripheral parts 62b are positioned on different radial lines as viewed in the axial direction.

The plate-shaped pieces 62 have a thickness of about 0.25 to 1 mm. Preferably, the plate-shaped pieces 62 have a thickness of about 0.5 mm. Referring to FIG. 10, the plate-shaped pieces 62 have different lengths. Specifically, the first and second yoke sections 60 and 61 are configured by stacking eight plate-shaped pieces 62 in the circumferential direction. The first and second yoke sections 60 and 61 are formed on internal peripheral sides so that an outermost pair of plate-shaped pieces 621 and 628 has a shortest length. The pair of plate-shaped pieces 622 and 627 on internal sides of the plate-shaped pieces 621 and 628 is the next longest. The pair of plate-shaped pieces 623 and 626 on internal sides of the plate-shaped pieces 622 and 627 is the next longest. An innermost pair of plate-shaped pieces 624 and 625 is the longest. As a result of setting the plate-shaped pieces 62 to such lengths, an efficient configuration is achieved in which internal peripheral parts of adjacent fist and second stacked yokes 60 and 61 in the circumferential direction do not come into contact with each other. Thus, the largest possible cross-sectional area in a magnetic path is achieved.

Furthermore, as is illustrated in FIG. 7, the plate-shaped pieces 621 and 628, which are positioned at either external side in the circumferential direction, are formed with the lengths less than those of the other plate-shaped pieces 62 by about one-half. The purpose of this is to prevent adjacent plate-shaped pieces 621 and 628 from coming near each other in the circumferential direction and to prevent a magnetic flux from leaking between the adjacent plate-shaped pieces 621 and 628.

The plate-shaped pieces 62 are used jointly for the first and second yoke sections 61. The plate-shaped pieces 62 are stacked and interlocked with the first and second grooves 57a and 58a. The distal ends of the yoke external peripheral parts 62a are interlocked with, and held by, the first and second concavities 57c and 58c.

As a result of the position of the yoke 46, the yoke internal peripheral parts 62b are positioned on the internal peripheral side of the coil 44 and the yoke external peripheral parts 62a are positioned between the coil 44 and the permanent magnet 41. Also, the yoke internal peripheral parts 62b of the first and second yoke sections 61 are directly connected to each other. Consequently, there is no need for other members composed of magnetic material to be used for connecting the first and second yoke sections 61. Thus, resistance is minimized.

Figure 4:
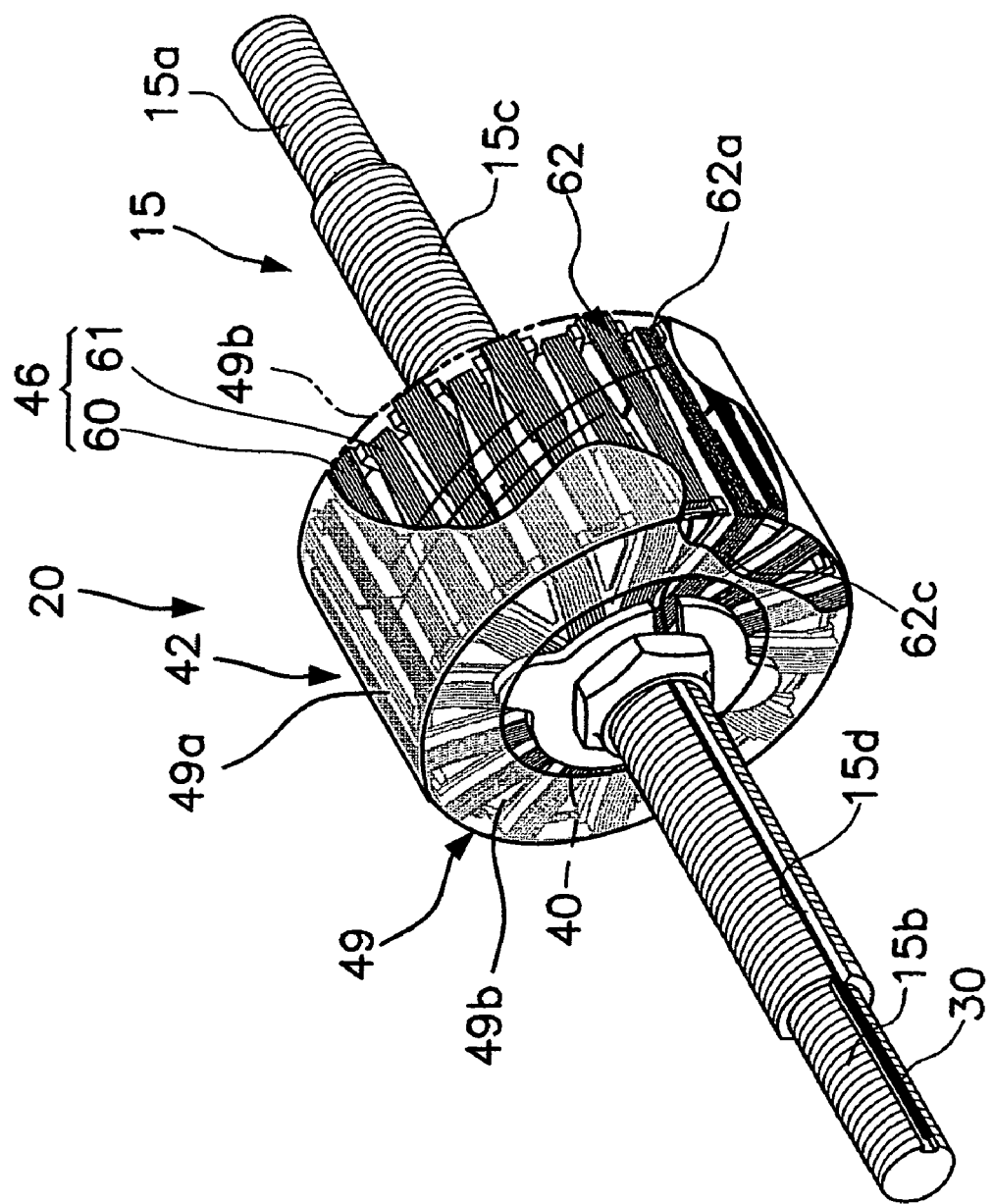
FIG. 4 is a perspective view of an internal fixing unit containing the claw-pole electric generator illustrated in FIGS. 2 and 3 in accordance with the first embodiment of the present invention.
Figure 5B:
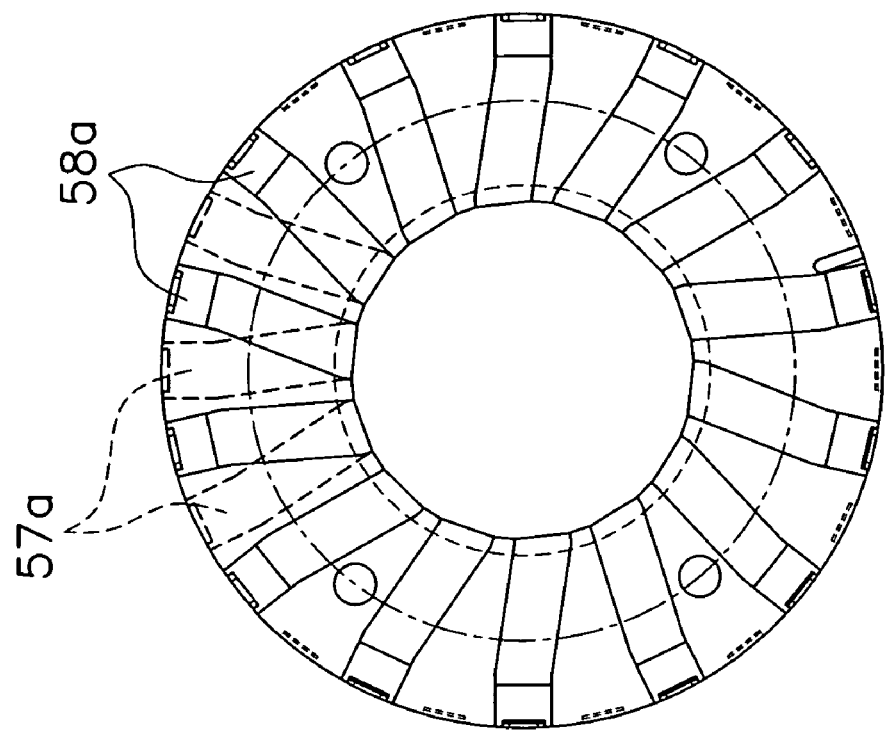
FIG. 5B is an enlarged, axial end elevational view of the bobbin of the claw-pole electric generator illustrated in FIGS. 2 and 3 in accordance with the first embodiment of the present invention.
Figure 5A:
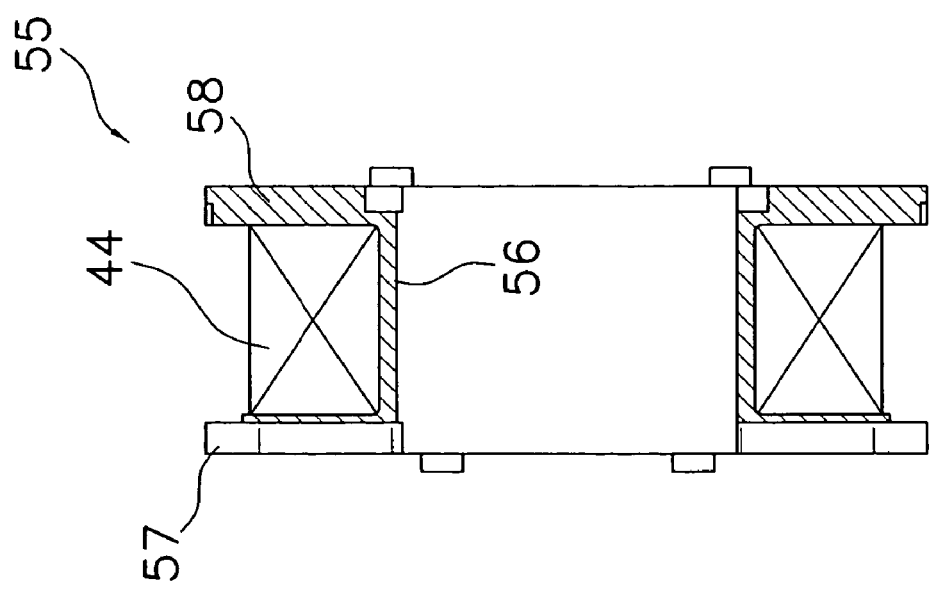
FIG. 5A is a longitudinal cross-sectional side view of a bobbin of the claw-pole electric generator illustrated in FIGS. 2 and 3 in accordance with the first embodiment of the present invention.
Figure 6B:
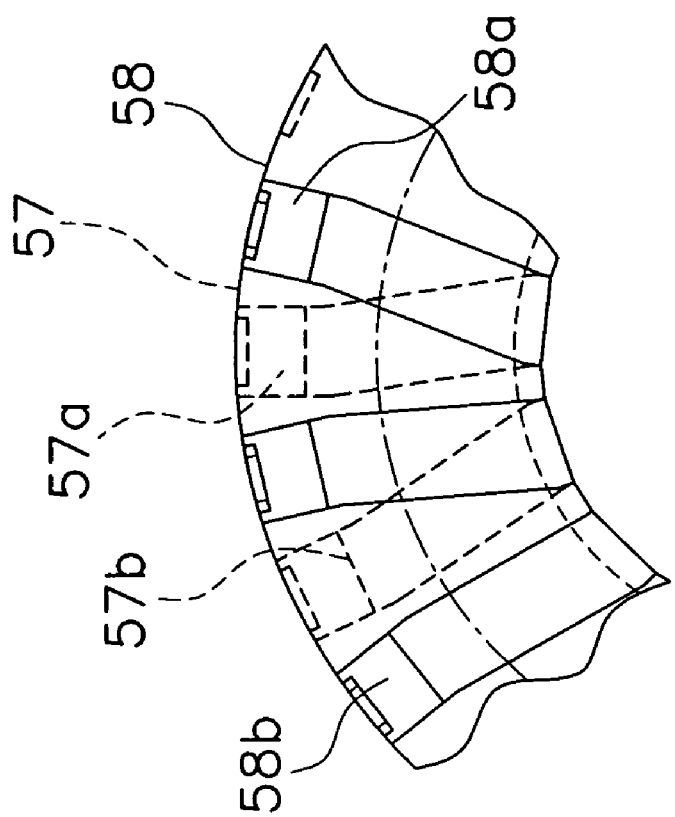
FIG. 6B is an enlarged, partial axial end elevational view in FIG. 5B in accordance with the first embodiment of the present invention.
Figure 6A:
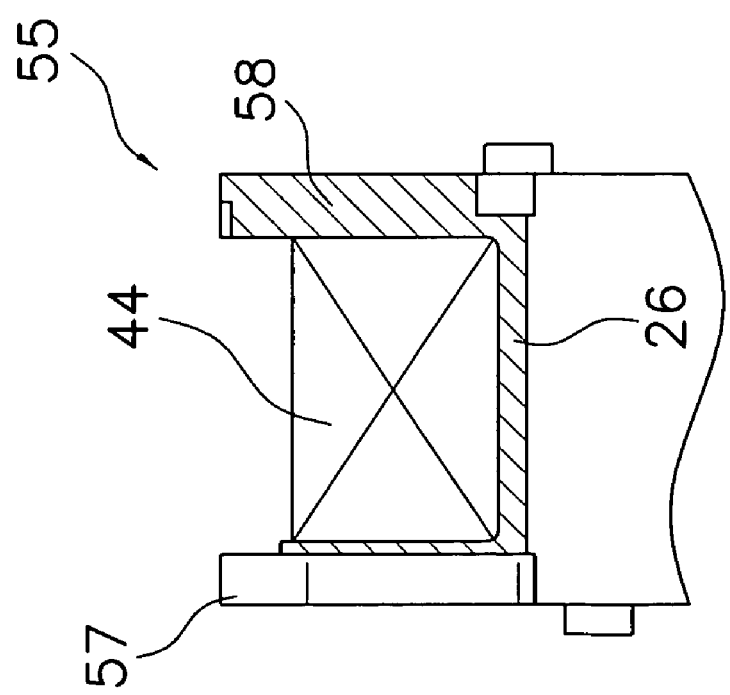
FIG. 6A is an enlarged, partial cross-sectional view in FIG. 5A in accordance with the first embodiment of the present invention.

Referring to FIGS. 2 and 4, the cover member 49 is formed so as to cover the external peripheral surface and both sides of the yoke 46, as shown in FIGS. 2 and 4. The cover member 49 has an external peripheral part 49a and a pair of lateral parts 49b. The pair of lateral parts 49b covers both sides of the yoke 46. The external peripheral part 49a covers the external peripheral surface of the yoke. The cover member 49 is formed by using heat to compress a cylindrical member made of a heat-shrinkable synthetic resin. The cover member 49 is made of a heat-shrinkable transparent synthetic resin, for example, selected from the group consisting of vinyl chloride resin, fluorine resin, silicone resin, ethylene-propylene resin, and polyethylene terephthalate (PET) resin. The cover member 49 easily aligns with the external peripheral surface of the yoke 46 by pressing the plate-shaped pieces 62 during shrinkage against an internal peripheral side.

In this embodiment, the cover member 49 is made of a polyethylene terephthalate (PET) resin with a thickness of, for example, about 0.05 mm. The thickness of the cover member 49 may be, for example, about 0.03 mm to 0.5 mm. Preferably, the thickness of the cover member 49 is about 0.04 mm to 0.2 mm. If the thickness of the cover member 49 is less than about 0.03 mm, the cover member 49 is easily torn and damaged. It is difficult for the plate-shaped pieces 62 to be aligned during shrinkage by the cover member 49. Also, if the thickness exceeds about 0.5 mm, a gap must be formed with the permanent magnet 41. If the thickness exceeds about 0.5 mm, electricity generating efficiency is reduced. Since the cover member 49 covers at least the external peripheral surface of the yoke 46 that has few occurrences of eddy currents, the plate-shaped pieces 62 are likely to be aligned. Therefore, even if the gap is made smaller between the permanent magnet 41 and the yoke external peripheral parts 62a, the yoke 46 is not likely to come into contact with the permanent magnet 41. Moreover, since the yoke 46 is not entirely hardened by a synthetic resin and only at least part of the external peripheral surface of the yoke 46 is covered, a weight increase in the internal fixing unit 42 is slight even with the cover member 49 provided. Thus, the weight increase in the electricity-generating mechanism 20 is minimized.

Next, electricity generation by the electric generator hub 10 will be described.

When the front wheel 6 or the hub shell 18 rotates in relation to the hub axle 15, the permanent magnet 41 rotates in relation to the internal fixing unit 42 fixed in place on the hub axle 15. The permanent magnet 41 is thereby rotated around the coil 44 and the external peripheral sides of the yoke external peripheral parts 62a.

The yoke external peripheral parts 62a of the first yoke sections 60 and the yoke external peripheral parts 62a of the second yoke sections 61 are designed so that one receives a magnetic flux supply of the S pole from the permanent magnet 41 when the other receives a magnetic flux supply of the N pole. Accordingly, one of the first and second yoke sections 60 and 61 receives the magnetic flux supply of the N pole from the permanent magnet 41 when the other of the first and second yoke sections 60 and 61 receives the magnetic flux supply from the S pole. Specifically, as a result of the permanent magnet 41 rotating around the external peripheral sides of the yoke external peripheral parts 62a of the first and second yoke sections 60 and 61, a first state and a second state are created. In the first state, the first yoke sections 60 serve as the N pole and the second yoke sections 61 serve as the S pole. In the second state, the first yoke sections 60 serve as the S pole and the second yoke sections 61 serve as the N pole. An alternating magnetic flux that magnetically links the first and second yoke sections 60 and 61 is created in the yoke internal peripheral parts 62b (core yoke portion 48) of the first and second yoke sections 60 and 61. As a result of the alternating magnetic flux being created in the internal side of the coil 44 an electric current is induced in the coil 44 and electricity is generated.

In the electric generator hub 10 of this embodiment, the yoke 46 is configured by stacking the plate-shaped pieces 62. The formation of eddy currents is therefore reduced more so than when the yoke is configured by conventional metallic plate press molding.

The shape of the yoke 46 is modified and the internal peripheral portions of the opposing first and second yoke sections 60 and 61 are directly connected to each other. Therefore, another member is not needed to connect the first and second yoke sections 60 and 61. A sufficient cross-sectional area needed for the magnetic flux to pass through is ensured. As a result, magnetic resistance is minimized and efficiency is improved.

Furthermore, since at least the external peripheral surface of the yoke 46 is covered by the cover member 49, the plate-shaped pieces 62 are not likely to be out of alignment. Therefore, the yoke 46 is not likely to come into contact with the permanent magnet 41 even if the gap is made smaller between the permanent magnet 41 and the yoke external peripheral parts 62a.

SECOND EMBODIMENT

Figure 11:
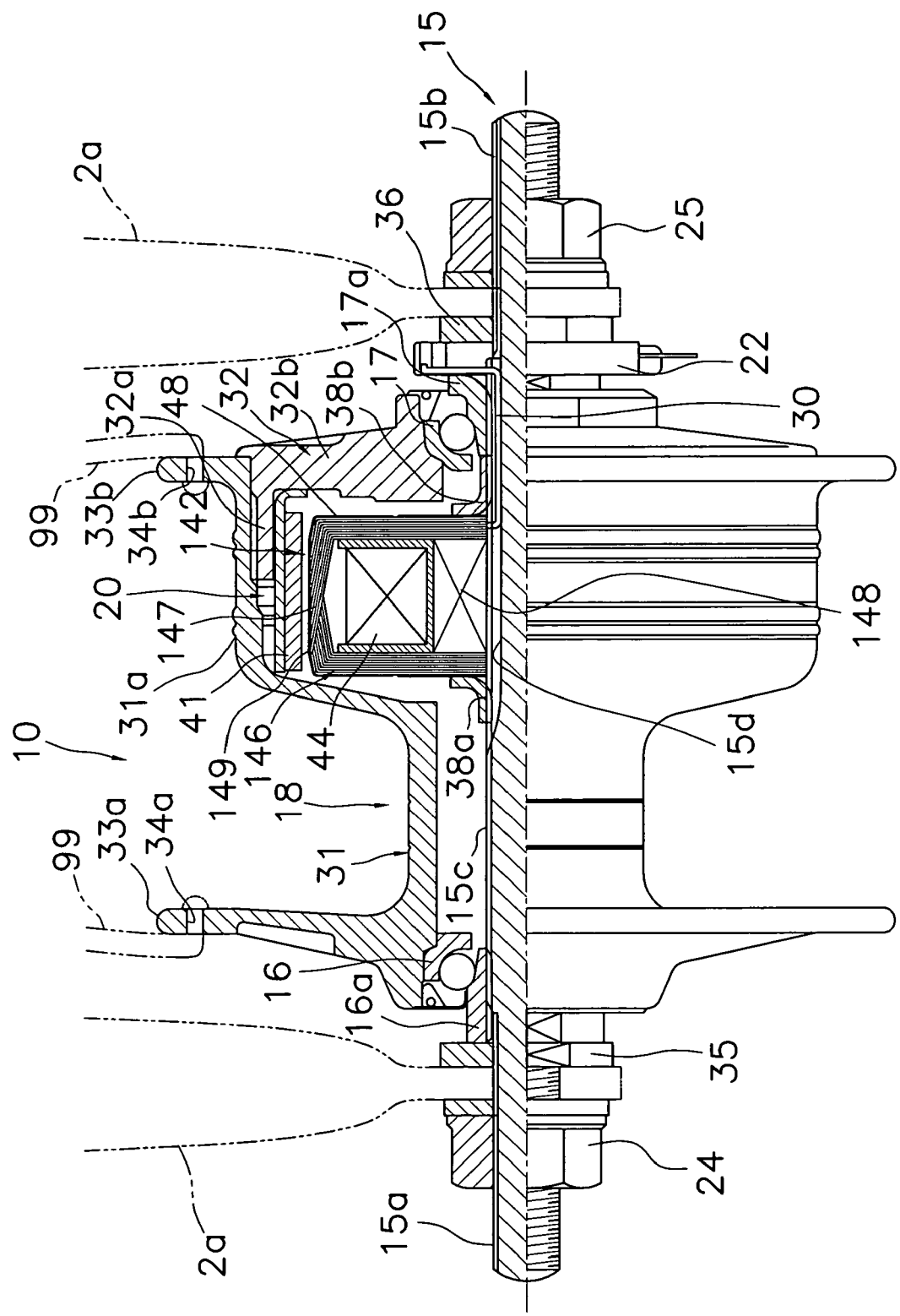
FIG. 11 is a partial cross-sectional view of a claw-pole electric generator of the bicycle in accordance with a second embodiment of the present invention.

Referring now to FIG. 11, a generator hub in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The previous embodiment disclosed a yoke 46 obtained by stacking the plate-shaped pieces 62 in the circumferential direction, but the present invention can also be applied to a yoke 146 in which a plurality of plate-shaped pieces 162 is stacked in the axial direction of the hub 10, as shown in FIG. 11.

The yoke 146 has a stator yoke portion 147 and a core yoke portion 148. The stator yoke portion 147 is disposed between the permanent magnet 41 and the coil 44. The core yoke portion 148 is magnetically linked with the stator yoke portion 147. The core yoke portion 148 is disposed between the external periphery of the coil 44 and the hub axle 15. The stator yoke portion 147 is separate from the core yoke portion 148.

Figure 12:
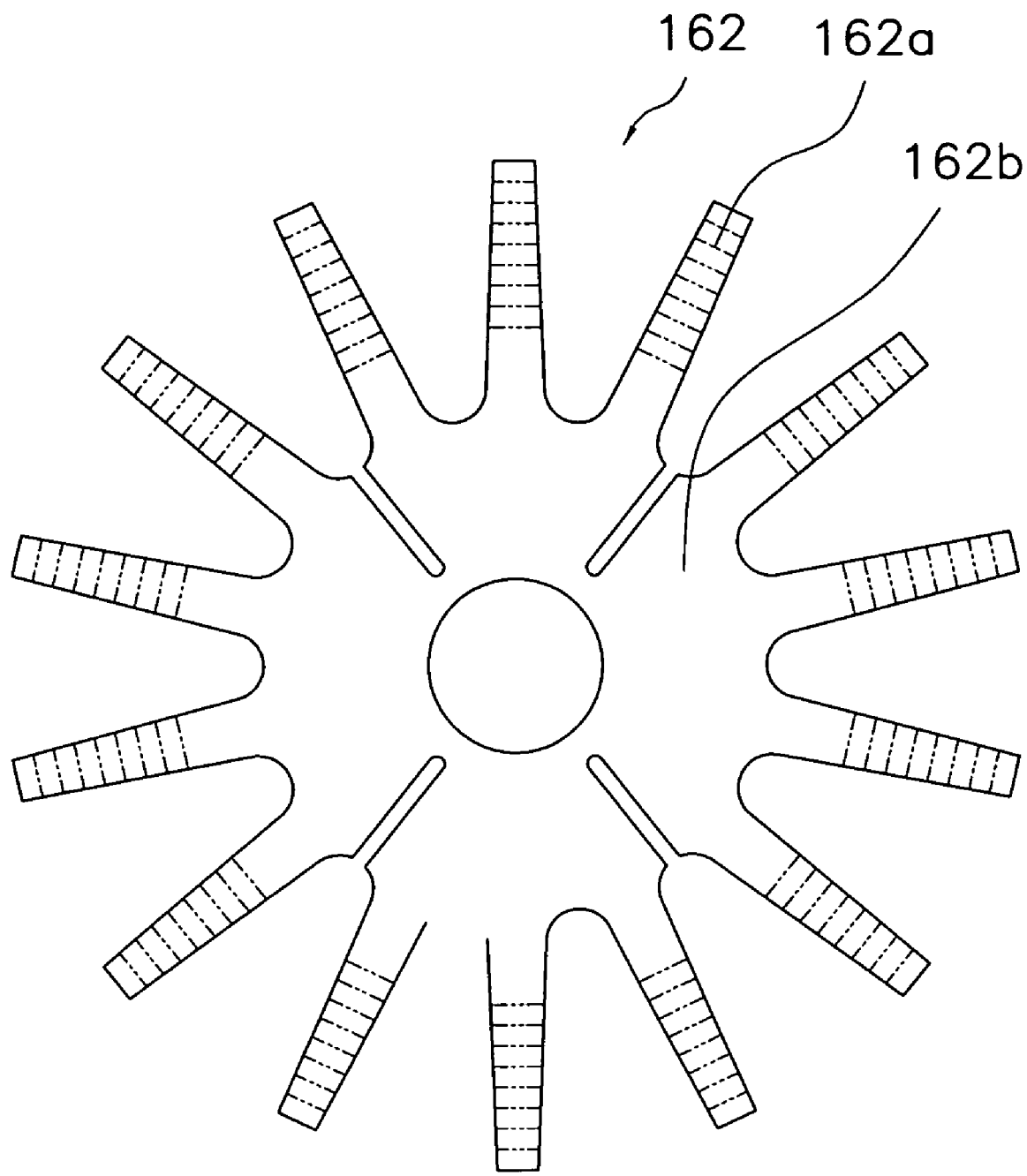
FIG. 12 is an axial end elevational view of a plate-shaped piece of a yoke illustrated in FIG. 11 in accordance with the second embodiment of the present invention.

The yoke 146 has a plurality of first yoke sections 160 and a plurality of second yoke sections 161. The first and second yoke sections 160 and 161 are configured by stacking a plurality of plate-shaped pieces 162, shown in FIG. 12, in the axial direction of the hub 10. Each of the plate-shaped pieces 162 has substantially the same basic shape. Each of the plate-shaped pieces 162 has a plurality of yoke external peripheral parts 162a and a disc part 162b. The disc part 162b is mounted on the hub axle 15 at both ends of the bobbin 55. Each of the yoke external peripheral parts 162a has a portion extending in the radial direction from an external periphery of the disc part 162b. The yoke external peripheral parts 162a are curved along the hub axle 15. The yoke external peripheral parts 162a function as a stator yoke portion 147.

Figure 13:
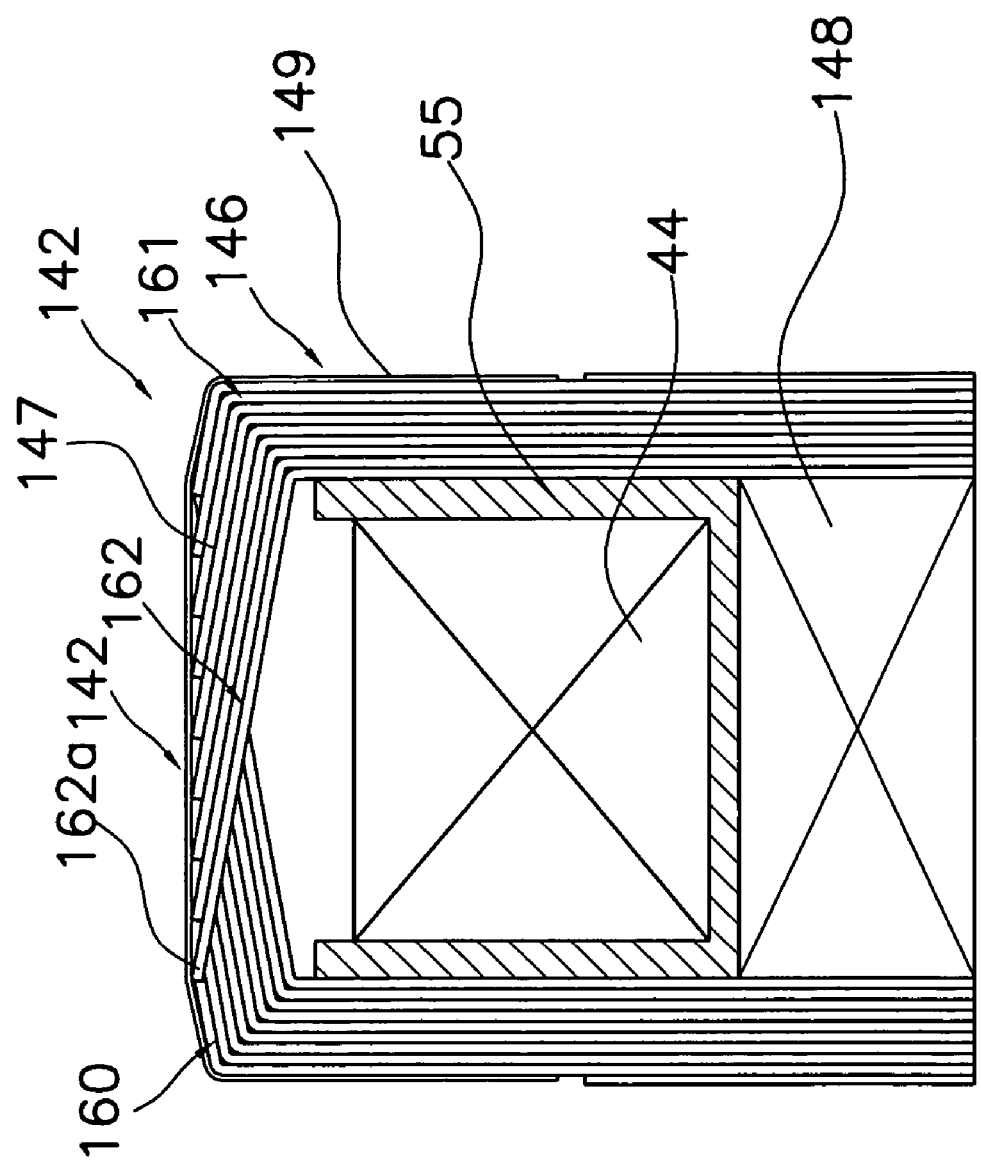
FIG. 13 is an enlarged partial cross-sectional view of the yoke illustrated in FIGS. 11 and 12.

In the first and second yoke sections 160 and 161, the yoke external peripheral parts 162a are disposed alternately, similar to the previous embodiments. The yoke external peripheral parts 162a are also disposed so as to surround the coil 44. The length of the yoke external peripheral parts 162a is greatest at the plate-shaped pieces 162 nearest the coil 44 and gradually decreases from this point, as shown by the double-dashed line in FIG. 12. However, curved positions are designed so that the plate-shaped pieces 162 nearest the coil 44 have the smallest radius of curvature. The radius of curvature gradually increases from this point, as is made clear from FIG. 13. The yoke external peripheral parts 162a are configured to curve at an obtuse angle from the disc part 162b so as to extend away from the external peripheral part of the disc part 162b somewhat in the radial direction from the axial direction of the hub axle 15. A width of the yoke external peripheral part 162a decreases towards a distal end. The plate-shaped pieces 162 are formed so that the lines connecting the distal ends of the yoke external peripheral parts 162a are straight lines. The plate-shaped pieces 162 are disposed in alignment in the axial direction, as shown in FIG. 13. A cover member 149 is mounted so as to cover the yoke external peripheral parts 162a.

When an angle of curvature fluctuates, the yoke external peripheral parts 162a of the plate-shaped pieces 162 become uneven. However, even if the angle of curvature varies, it can still be corrected and adjusted by using the cover member 149. Therefore, the yoke 146 is not likely to come into contact with the permanent magnet 41 even if a gap is made smaller between the permanent magnet 41 and the yoke external peripheral parts 162a. Moreover, since the yoke 146 is not entirely hardened by a synthetic resin and only at least the external peripheral surface of the yoke 146 is covered, a weight increase in the internal fixing unit 142 is slight even with the cover member 149. Thus, a weight increase in the electricity-generating mechanism 20 is minimized.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A claw-pole electric generator comprising:
   a circumferentially arranged permanent magnet;
   a ring-shaped coil configured and arranged on an internal peripheral side of the permanent magnet to rotate relative to the permanent magnet;
   a yoke having a stator yoke portion disposed between the coil and the permanent magnet, and a core yoke portion magnetically linked to the stator yoke portion and disposed on an external periphery of the coil such that the yoke is rotatable relative to the permanent magnet; and
   a cover member covering at least part of an external peripheral surface of the yoke, the cover member being disposed between the yoke and the permanent magnet, and formed by heat-shrinking a cylindrical member made of a heat-shrinkable synthetic resin, the cover member includes a heat-shrinkable synthetic resin selected from the group consisting of vinyl chloride resin, fluorine resin, silicone resin and ethylene-propylene resin;
   the stator yoke portion including a plurality of first and second yoke sections disposed on opposite sides of the coil in an axial direction, respectively, with each of the first and second yoke sections having a plurality of plate-shaped pieces in a stacked arrangement.

2. The claw-pole electric generator according to claim 1, wherein the plate-shaped pieces are stacked in a circumferential direction between the coil and the permanent magnet with the first and second yoke sections positioned alternately in the circumferential direction and the cover member covering at least part of external peripheral parts of the plate-shaped pieces.

3. The claw-pole electric generator according to claim 1, wherein the first and second yoke sections are positioned alternately in the circumferential direction, and
   the cover member covers at least part of the first and second yoke sections.

4. The claw-pole electric generator according to claim 1, wherein the plate-shaped pieces of the first and second yoke sections are integral one-piece unitary members that form both the stator yoke portion and the core yoke portion.

5. The claw-pole electric generator according to claim 1, wherein each of the plate-shaped pieces has an external peripheral part that forms the stator yoke portion and an internal peripheral part that forms the core yoke portion.

6. The claw-pole electric generator according to claim 5, wherein the internal peripheral parts extend in the axial direction.

7. The claw-pole electric generator according to claim 1, further comprising
   a bobbin having first and second flanges and a cylindrical core extending in the axial direction between the first and second flanges, the coil being wound around an external periphery of the cylindrical core.

8. The claw-pole electric generator according to claim 1, wherein the cover member has an external peripheral part covering the external peripheral surface of the yoke, and a pair of lateral parts covering side surfaces of the yoke.

9. A bicycle electric generator hub comprising:
   a hub axle;
   a cylindrical hub shell disposed on an external peripheral side of the hub axle;
   a plurality of bearings arranged to rotatably support the hub shell with respect to the hub axle; and
   a claw-pole electric generator including
      a circumferentially arranged permanent magnet that is disposed between the bearings and that is circumferentially disposed on an internal peripheral surface of the hub shell,
      a ring-shaped coil disposed on an internal peripheral side of the permanent magnet on the hub axle to rotate relative to the permanent magnet,
      a yoke having a stator yoke portion disposed between the coil and an internal peripheral side of the permanent magnet on the hub axle, and a core yoke portion magnetically linked to the stator yoke portion and disposed on an external periphery of the coil such that the yoke is rotatable relative to the permanent magnet, and
      a cover member covering at least part of an external peripheral surface of the yoke, the cover member being disposed between the yoke and the permanent magnet, the cover member formed by heat-shrinking a cylindrical member made of a heat-shrinkable synthetic resin, the cover member including a heat-shrinkable synthetic resin selected from the group consisting of vinyl chloride resin, fluorine resin, silicone resin and ethylene-propylene resin,
      the stator yoke portion including a plurality of first and second yoke sections disposed on opposite sides of the coil in an axial direction, respectively, with each of the first and second yoke sections having a plurality of plate-shaped pieces in a stacked arrangement.

10. The bicycle electric generator hub according to claim 9, wherein the plate-shaped pieces are stacked in a circumferential direction between the coil and the permanent magnet.

11. The bicycle electric generator hub according to claim 9, wherein the first and second yoke sections are positioned alternately in the circumferential direction, and
    the cover member covers at least part of the first and second yoke sections.

12. The bicycle electric generator hub according to claim 9, wherein the plate-shaped pieces of the first and second yoke sections are integral one-piece unitary members that form the core yoke portion.

13. The bicycle electric generator hub according to claim 9, wherein each of the plate-shaped pieces has an external peripheral part that forms the stator yoke portion and an internal peripheral part that forms the core yoke portion.

14. The bicycle electric generator hub according to claim 13, wherein the internal peripheral parts extend in the axial direction.

15. The bicycle electric generator hub according to claim 9, further comprising
    a bobbin having first and second flanges and a cylindrical core extending in the axial direction between the first and second flanges, the coil being wound around an external periphery of the cylindrical core.

16. The bicycle electric generator hub according to claim 9, wherein the cover member has an external peripheral part covering the external peripheral surface of the yoke, and a pair of lateral parts covering side surfaces of the yoke.

* * * * *